United States Patent
Yoshida et al.

(10) Patent No.: US 9,711,984 B2
(45) Date of Patent: Jul. 18, 2017

(54) HIGH VOLTAGE GENERATION METHOD AT BATTERY SYSTEM

(71) Applicant: Renesas Electronics America Inc., Santa Clara, CA (US)

(72) Inventors: Kenji Yoshida, Cupertino, CA (US); Tetsuo Sato, San Jose, CA (US); Shigeru Maeta, San Jose, CA (US); Chikara Kobayashi, Tokyo (JP)

(73) Assignee: Renesas Electronics America Inc., Santa Clara, CA (US)

( * ) Notice: Subject to any disclaimer, the term of this patent is extended or adjusted under 35 U.S.C. 154(b) by 186 days.

(21) Appl. No.: 14/525,546

(22) Filed: Oct. 28, 2014

(65) Prior Publication Data

US 2016/0118825 A1 Apr. 28, 2016

(51) Int. Cl.
*H02J 7/00* (2006.01)
*H02M 3/158* (2006.01)
*H02M 1/10* (2006.01)

(52) U.S. Cl.
CPC ........... *H02J 7/0052* (2013.01); *H02M 3/158* (2013.01); *H02M 1/10* (2013.01); *H02M 3/1582* (2013.01)

(58) Field of Classification Search
CPC .............................. H02J 7/0052; H02M 3/158
USPC ......................................... 320/107, 128, 137
See application file for complete search history.

(56) References Cited

U.S. PATENT DOCUMENTS

| | | | | |
|---|---|---|---|---|
| 5,734,254 A | * | 3/1998 | Stephens | H02J 7/025 320/106 |
| 6,061,255 A | * | 5/2000 | Chik | H02M 3/33592 363/21.06 |
| 6,479,970 B2 | * | 11/2002 | Reddy | H02J 9/062 307/66 |
| 6,741,127 B2 | * | 5/2004 | Sasho | H03F 1/0227 330/136 |
| 6,801,023 B2 | * | 10/2004 | Wu | H02J 9/062 323/222 |
| 7,009,371 B2 | * | 3/2006 | Nakata | H02M 1/36 323/222 |
| 7,230,452 B2 | * | 6/2007 | Hoon | H03K 17/04206 326/83 |

(Continued)

FOREIGN PATENT DOCUMENTS

GB 2451910 A * 2/2009 ............ H02M 7/797

*Primary Examiner* — M'Baye Diao
(74) *Attorney, Agent, or Firm* — Campbell Stephenson LLP

(57) ABSTRACT

A method and apparatus for generating a high voltage at a battery system. The apparatus in one embodiment includes a supply node configured for direct or indirect coupling to a supply voltage. A converter is coupled between an input node and an output node, wherein the converter is configured to operate in a forward mode or a reverse mode. The converter generates a voltage at the converter output node for charging a battery when operating in the forward mode, wherein a magnitude of the voltage generated at the converter output node is less than a magnitude of the supply voltage. The converter generates a voltage at the converter input node when operating in the reverse mode, wherein a magnitude of the voltage generated at the converter input node is different than a magnitude of a voltage provided by the battery. A control circuit is coupled to and configured to control operation of the converter in the forward mode or the reverse mode.

9 Claims, 6 Drawing Sheets

(56) References Cited

U.S. PATENT DOCUMENTS

| | | | | |
|---|---|---|---|---|
| 7,511,457 B2* | 3/2009 | Emori | ............... | B60L 3/0046 320/116 |
| 7,893,678 B2* | 2/2011 | Blanken | ............... | H02M 3/156 323/285 |
| 7,977,926 B2* | 7/2011 | Williams | ............... | H02M 3/158 323/223 |
| 8,102,147 B2* | 1/2012 | Jung | ............... | H02J 7/025 320/108 |
| 8,350,546 B2* | 1/2013 | Williams | ............... | H02M 1/32 323/222 |
| 8,405,358 B2* | 3/2013 | Li | ............... | H02J 7/0072 320/128 |
| 9,369,044 B2* | 6/2016 | Teh | ............... | H02M 3/1584 |
| 2004/0085145 A1* | 5/2004 | Dinn | ............... | H03F 3/2171 331/117 R |
| 2005/0275382 A1* | 12/2005 | Stessman | ............... | A61N 1/3708 320/143 |
| 2009/0123795 A1* | 5/2009 | Chuah | ............... | H01M 8/04156 429/414 |
| 2009/0278493 A1* | 11/2009 | Alden | ............... | H01R 13/6633 320/108 |
| 2012/0062190 A1* | 3/2012 | Haiplik | ............... | H02M 3/156 323/271 |
| 2012/0140526 A1* | 6/2012 | Martinelli | ............... | H02J 7/35 363/21.06 |
| 2012/0140538 A1* | 6/2012 | Martinelli | ............... | H02J 7/35 363/127 |
| 2013/0169610 A1* | 7/2013 | Huang | ............... | G09G 3/3696 345/211 |
| 2016/0006289 A1* | 1/2016 | Sever | ............... | H02J 7/045 320/108 |

\* cited by examiner

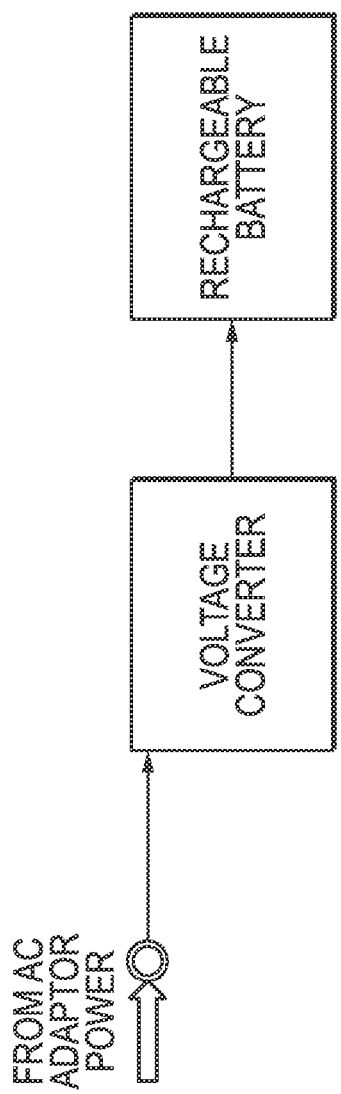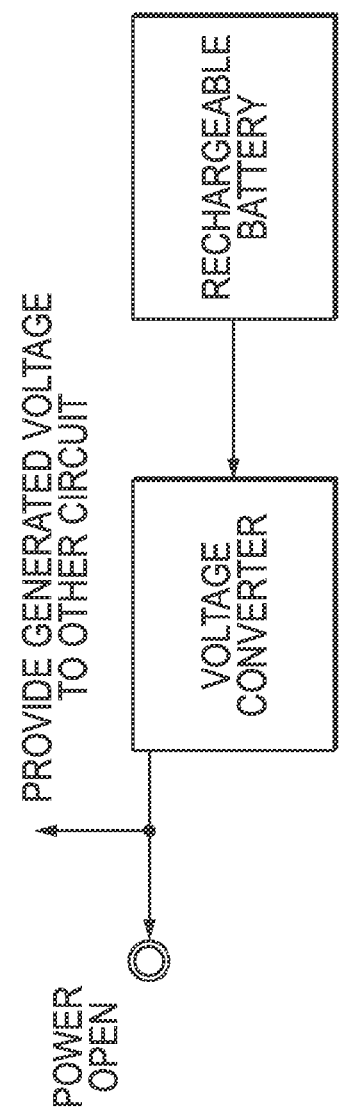

HIGH VOLTAGE GENERATION METHOD AT BATTERY SYSTEM

BACKGROUND

Mobile devices such as smart phones, tablet computers (tablets), etc., employ rechargeable batteries. Mobile devices are often sold with AC power adapters to enable users to recharge the batteries when needed. AC power adapters typically generate DC power in high voltage form. Batteries, however, often require a lower voltage DC power to recharge.

DC-DC voltage convertors, such as step down DC-DC converters, are often employed inside mobile devices and used in converting high voltage DC power into low voltage DC power for recharging batteries. These DC-DC converters are often non-isolated, which means they do not employ a transformer when converting power. The present invention will be described with reference to DC-DC voltage converters it being understood the present invention should not be limited thereto.

SUMMARY

A method and apparatus for generating a high voltage at a battery system. The apparatus in one embodiment includes a supply node configured for direct or indirect coupling to a supply voltage. A converter is coupled between an input node and an output node, wherein the converter is configured to operate in a forward mode or a reverse mode. The converter generates a voltage at the converter output node for charging a battery when operating in the forward mode, wherein a magnitude of the voltage generated at the converter output node is less than a magnitude of the supply voltage. The converter generates a voltage at the converter input node when operating in the reverse mode, wherein a magnitude of the voltage generated at the converter input node is different than a magnitude of a voltage provided by the battery. A control circuit is coupled to and configured to control operation of the converter in the forward mode or the reverse mode.

BRIEF DESCRIPTION OF THE DRAWINGS

The present invention may be better understood in its numerous objects, features, and advantages made apparent to those skilled in the art by referencing the accompanying drawings.

FIGS. 1A and 1B are block diagrams illustrating a voltage converter employing the present invention.

The use of the same reference symbols in different drawings indicates similar or identical items.

DETAILED DESCRIPTION

FIGS. 1A and 1B illustrate in block diagram form a voltage converter employing the present invention. The voltage converter is coupled to a rechargeable battery and a power node capable of receiving high voltage DC power from an AC power adapter. The combination of voltage converter and rechargeable battery may be employed in a mobile device.

FIG. 1A shows the voltage converter receiving high voltage DC power. FIG. 1A shows the voltage converter operating in a forward mode in which it converts the high voltage DC power into low voltage DC power for recharging the battery. The voltage converter can also operate in a reverse mode when the power node is open. In the reverse mode, the voltage converter converts low voltage DC power provided by the battery into a lower, equal or higher voltage DC power for use by another circuit (not shown). For the purposes of explanation only, the present invention will be described with reference to the voltage converter converting the low voltage DC power provided by the battery into a higher voltage DC power, it being understood the present invention should not be limited thereto. FIG. 1B shows the voltage converter operating in the reverse mode.

Figure 2A:
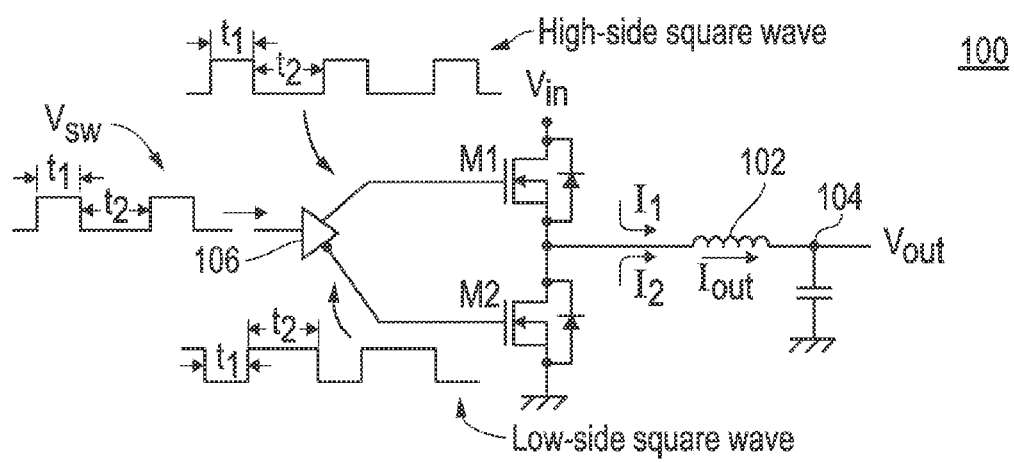
FIG. 2A is block diagram illustrating an example DC-DC converter that could be employed in the voltage converter of FIGS. 1A and 1B.

The voltage converter shown in FIGS. 1A and 1B may take many different forms. In one embodiment, the voltage converter of FIGS. 1A and 1B my employ a non-isolated, DC-DC converter (hereinafter DC-DC converter), it being understood that the voltage converter of FIGS. 1A and 1B should not be limited thereto. FIG. 2A illustrates in block diagram form, relevant components of an example DC-DC converter 100, it being understood DC-DC converters should not be limited thereto. The example DC-DC converter 100 is coupled to receive an input DC voltage Vin from the AC power adapter (not shown). DC-DC converter 100 generates a DC output voltage (i.e., Vout), which is lower in magnitude than Vin. In this regard, DC-DC converter 100 is operating in the forward mode as a step-down converter.

With continuing reference to FIG. 2A, high side and low side transistors M1 and M2, respectively, are coupled at a common node to inductor 102, which in turn is coupled to output node 104. For purposes of explanation only, all transistors described herein will take form in an N-channel or P-channel MOSFETs, it being understood that the present invention should not be limited thereto. Moreover, DC-DC converters described herein can be formed on a single silicon substrate, either alone or with other circuit devices such as drivers, analog-to-digital converters, microcontrollers, etc., it being understood the present invention should not be limited thereto.

Figure 2B:
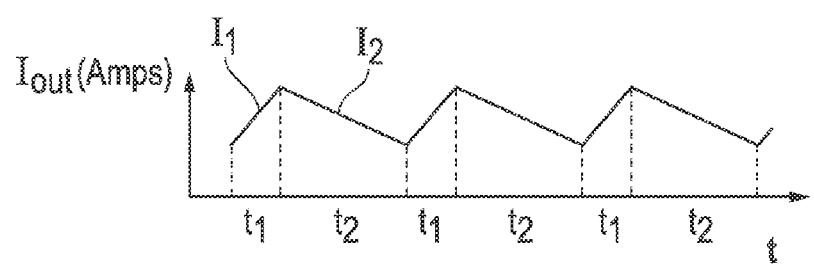
FIG. 2B is a graph illustrating operational aspects of the DC-DC converter in FIG. 2A.

Driver 106 generates complimentary, high side and low side square waves for controlling transistors M1 and M2, respectively. In the illustrated example, driver 106 generates the complimentary square waves as a function of a square wave input Vsw provided by, for example, a microcontroller (not shown). The pulses of the complimentary high side and low side square waves activate transistors M1 and M2, respectively. The high side square wave controlling transistor M1 has a pulse width of t1, while the low side square wave controlling transistor M2 has a pulse width of t2. Transistor M1 transmits current I1 to output node 104 via inductor 102 with each pulse of the high side square wave, and transistor M2 transmits current I2 from ground to output node 104 via inductor 102 with each pulse of the low side square wave. FIG. 2B illustrates a graphical representation of currents I1 and I2, the combination of which forms Iout. Since the high side and low side square waves are complimentary, which means they do not overlap, only one of the transistors M1 and M2 is activated at a time.

Square wave input Vsw can have an adjustable duty cycle t1/(t1+t2). One of ordinary skill in the art understands the magnitude of Vout depends on duty cycle t1/(t1+t2). Thus, a microcontroller that generates Vsw can adjust the magnitude of Vout by adjusting the duty cycle t1/(t1+t2) for Vsw. The frequency of all square waves described herein can vary, it being understood that the present invention should not be limited thereto.

Some mobile devices such as smart phones and tablet computers employ internal system components (e.g., CPUs) that operate on low voltage power provided by rechargeable batteries. As noted, DC-DC converters can be used to recharge these batteries. It is also noted that while recharging the batteries, DC-DC converters can also provide operational power to internal system components.

Mobile devices can be manufactured with ports that provide high DC voltage (i.e., voltage higher than the voltage provided by internal batteries) to external devices. In order to provide this higher voltage, mobile devices are manufactured with an additional converter (e.g., a step-up DC-DC converter and associated microcontroller) for converting battery power for external use. Unfortunately, the inclusion of the additional converter increases the manufacturing costs of mobile devices.

Figure 3:
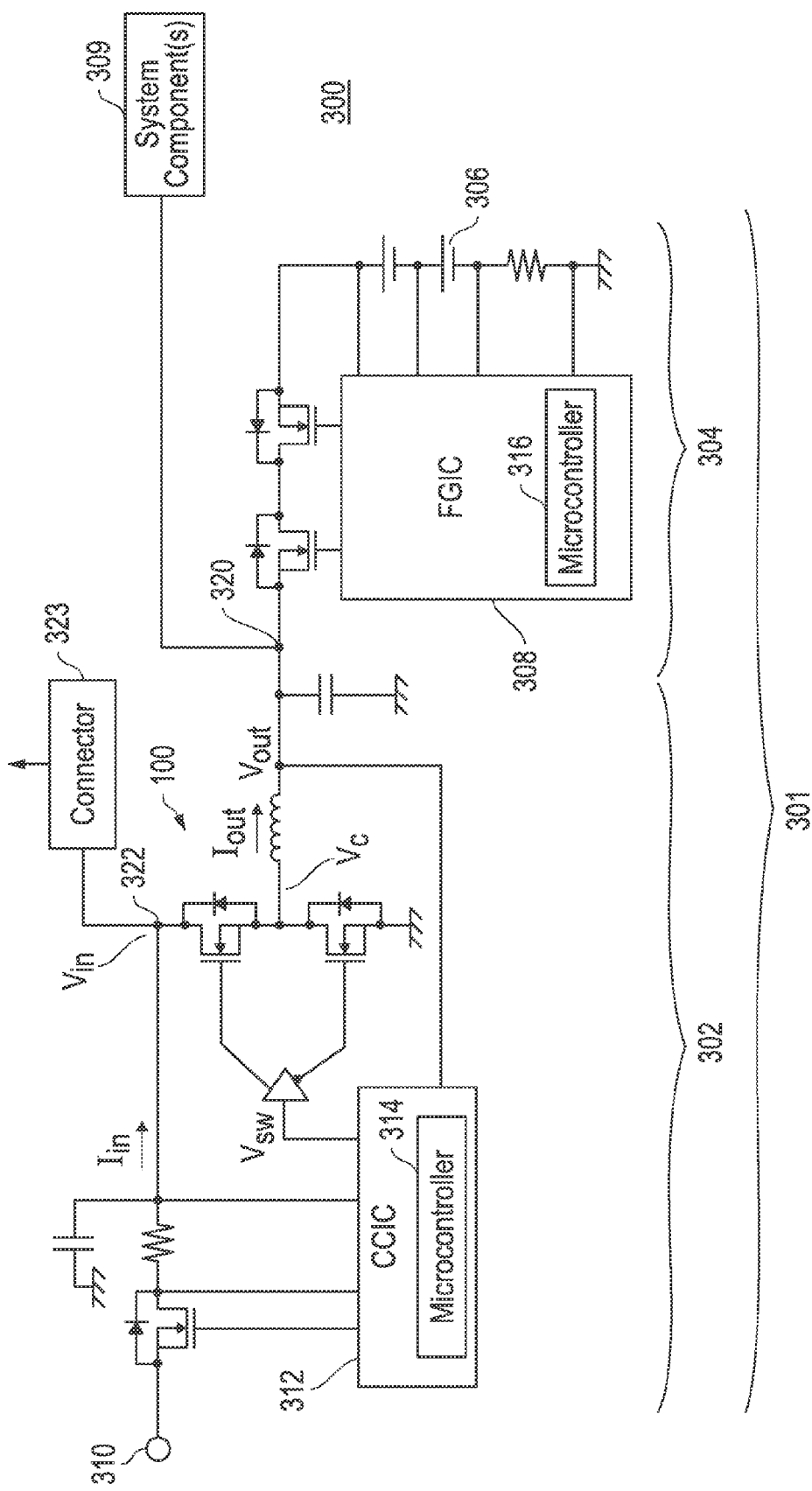
FIG. 3 is a block diagram illustrating an example mobile device employing one embodiment of the present invention.

FIG. 3 illustrates relevant components of an example mobile device 300 that employing one embodiment of the present invention. As will be more fully described, battery system 301 includes a voltage converter 302 coupled to a battery pack 304, which includes a rechargeable battery cell or cells (hereinafter battery) 306 and a fuel gage integrated circuit 308. In the embodiment shown in FIG. 3, converter 302 and battery pack 304 are coupled to one or more internal system components (e.g., a CPU) 309 and can provide low voltage power thereto. Converter 302 and battery pack 304 can also provide high voltage power to a device external to the mobile device. Mobile device 300 may take form in a smart phone, tablet computer, docking station, etc, or any other device that employs a rechargeable battery for mobile operation.

Battery system 301 can operate in distinct modes. In a charging or forward mode of operation, converter 302 converts high DC voltage power provided by an AC adapter (not show) into low voltage DC power for internal use, e.g., recharging battery 306. In a reverse mode of operation, converter 302 can convert low voltage DC power provided by battery 306 into high voltage DC power. This high voltage can be used to power a device, such as a device that is external to mobile device 300. Converter 302 can dynamically adjust the magnitude of the voltage it provides to the external device Importantly, mobile device 300 need not include a separate device (e.g., a step up DC-DC converter and associated microcontroller) for generating the high voltage power during mobile operation.

Converter 302 includes the DC-DC converter 100 of FIG. 1. DC-DC converter 100 can be operated in the forward mode as a step-down converter to convert high voltage provided by an AC adapter (not shown), into low voltage power at output node 320. The low voltage output of DC-DC converter 100 can be used for recharging battery 306. The low voltage output can also be used to power one or more system components 309 (e.g., a CPU) if present. DC-DC converter 100 can also be operated in the reverse mode as a step-up converter for converting low voltage provided by battery 306 into high voltage for use by an external device. DC-DC converter 100 provides this high voltage at external connector 323 via node 322. For purposes of explanation only, this description will presume that all internal system components, including the one or more system components 309, operate on the lower voltage power provided by DC-DC converter 100 or battery 306. In other words, converter 302 only provides high voltage power to external devices. Additionally, this description will presume converter 302 provides high voltage power to external devices only when converter 302 operates in the reverse mode. During this mode of operation, converter 302 is not coupled to the AC power adapter.

As noted, battery system 301 can provide high voltage power to an external device via node 322 and connector 323. In another embodiment, battery system 301 may include several connectors uniquely configured (e.g., sized) for connection to different types of external devices, respectively. Converter 302 or another device can selectively couple node 322 to any one of these several connectors. In this alternative embodiment, DC-DC converter 100 can be operated to provide the connector with a voltage having a magnitude that depends on the connector to which node 322 is coupled. In yet another embodiment, connector 323 can be selectively coupled to node 322 or node 320 to enable battery system 301 to provide an external device with low voltage power from battery 306 or high voltage power from DC-DC converter 100. Converter 302 or another device can selectively couple nodes 320 or 322 to connector 323 in this alternative embodiment.

With continuing reference to FIG. 3, converter 302 includes a converter control integrated circuit (CCIC) 312, which includes a microcontroller 314 and other components (not shown), e.g., analog-to-digital converters that can generate digital representations of Vout, Vin, Iin, etc. Microcontroller 314 can perform various functions in response to processing these digital representations and/or other information in accordance with executable instructions stored in memory. For example microcontroller 314 can use one or more digital representations of Vin and/or Iin to determine whether an AC power adapter is coupled to supply node 310. Microcontroller 314 can use one or more of the digital representations to calculate the duty cycle of Vsw that is needed to maintain Vin or Vout at a predetermined voltage magnitude.

Figures 4A, 4B:
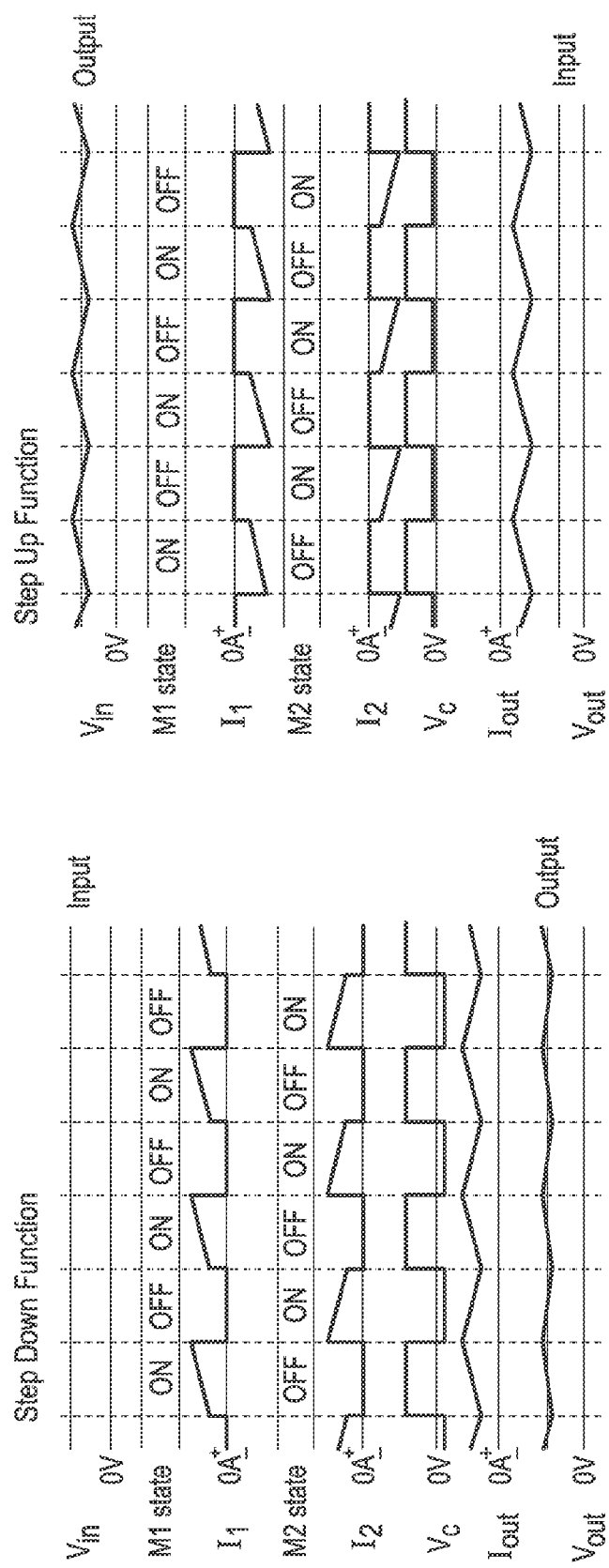
FIGS. 4A and 4B are timing charts illustrating operational aspects of the DC-DC converter employed in the mobile device of FIG. 3.

When microcontroller 312 detects supply node 310 is coupled to an AC power adapter, microcontroller 314 should operate DC-DC converter 100 in the forward mode of operation during which microcontroller 314 calculates a duty cycle t1/(t1+t2) for Vsw that is needed to maintain Vout at a first predetermined magnitude for charging battery 306. FIG. 4A is a timing chart that illustrates aspects of DC-DC converter 100 operating as a step-down converter during the forward mode of operation. When microcontroller 314 detects supply node 310 is open, microcontroller 314 may operate DC-DC converter 100 in the reverse mode of operation in which high voltage power is provided to an external device via node 322 and connector 323. In the reverse mode, microcontroller calculates a duty cycle t1/(t1+t2) needed to maintain the voltage at node 322 and connector 323 at a second predetermined magnitude, which is higher than the first predetermined magnitude. It is noted that microcontroller 314 may alter the duty cycle of Vsw in the reverse mode of operation as the voltage provided by battery 306 varies. Thus, as the charge on battery 306 depletes during the reverse mode of operation, microcontroller 314 decreases the duty cycle of Vsw in order to maintain the voltage at node 322 at the second predetermined magnitude. It should be noted that in the reverse mode of operation, the one or more system components 309 can continue operate using power provided by battery 306. FIG. 4B is a timing chart that illustrates aspects of DC-DC converter 100 operating as a step-up converter during the reverse mode of operation.

In an alternative embodiment, microcontroller 314 can receive information that identifies the type of external device coupled to connector 323. In this embodiment, microcontroller 314 can calculate the second predetermined magnitude of voltage needed by the external device, and adjust the duty cycle of Vsw accordingly. In other words, converter 302 can generate the external voltage with a magnitude that depends on the type of external device coupled to connector 323. Additional functions of microcontroller 314 are contemplated.

As noted, converter 302 can provide low voltage for use by the one or more system components 309 and/or for recharging battery 306 when operating in the forward mode. Converter 302 can also provide high voltage power for use by a device external to mobile device 300 when operating in the reverse mode. It is noted that in this latter mode of operation, one or more system components 309 may continue operating using the low voltage power provided by battery 306.

Battery pack 304 includes fuel gage integrated circuit (FGIC) 308, which includes a microcontroller 316 and other components (not shown) such as analog-to-digital converters that generate digital representations of, for example, the voltage across battery 306 and the current flow into or out of battery 306. Microcontroller 316 can perform various functions in response to processing these digital representations and/or other information in accordance with executable instructions stored in memory. For example microcontroller 316 can use the digital representations and/or other information to monitor operational parameters of battery 306. Microcontroller 316 can disconnect battery 306 from output node 320 if the voltage across battery 306 falls outside a predetermined range. Additionally, microcontroller 316 can calculate a value representing the total charge of battery 306, which in turn can be used to calculate the remaining time mobile device 300 can operate before battery 306 needs to be recharged. The time can be displayed by the mobile device 300. Additional functions of microcontroller 316 are contemplated. It is noted that microcontrollers 314 and 316 can communicate with each other while performing various functions such as monitoring and/or controlling the battery system. In one embodiment, a unified microcontroller can replace microcontrollers 314 and 316 and provide the functional features thereof. It is noted that components contained in CCIC 312 and FGIC 324 can operate off the voltage provided by battery 306 or DC-DC converter 100.

Figure 5:
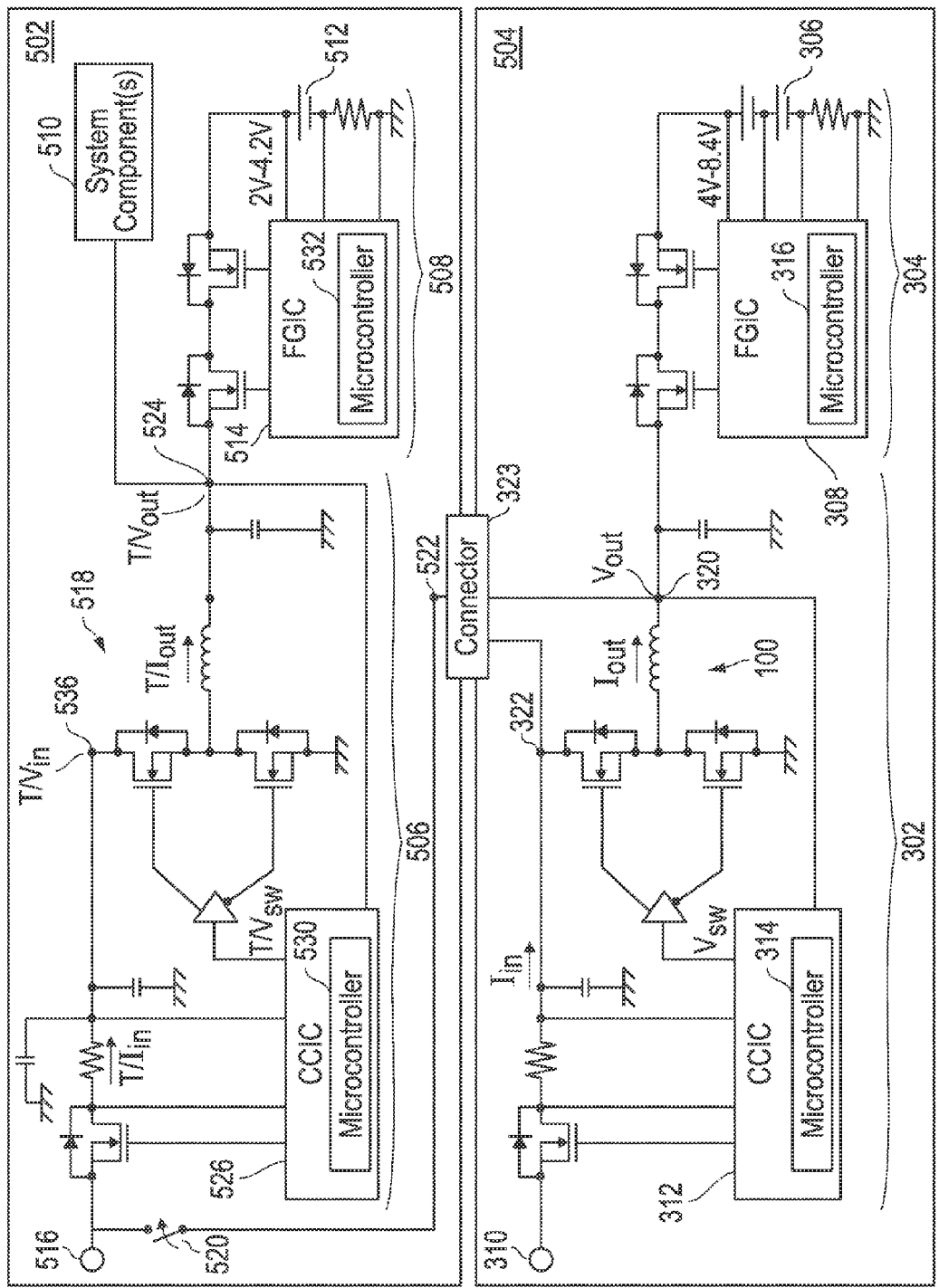
FIG. 5 is a block diagram illustrating an example mobile device employing another embodiment of the present invention.

As noted, mobile device 300 can provide high voltage power to an external device by reverse operation of DC-DC converter 100. To further illustrate this concept, FIG. 5 shows a mobile device 502 releasably connected to another mobile device 504. For the purposes of explanation only, mobile device 502 takes form in a tablet computer (tablet) while mobile device 504 takes form in a tablet computer docking station (docking station), it being understood that tablets and docking stations should not be limited thereto.

As will be more fully described, docking station 504 includes a DC-DC converter that can be operated in the forward or reverse modes. In the forward mode, the DC-DC converter can convert high voltage into low voltage (e.g., 4.0V-8.4V) for recharging a battery. In the reverse mode, the DC-DC converter can convert low voltage provided by the battery into high voltage for use by tablet 502.

With continuing reference to FIG. 5, docking station 504 contains a battery system that includes most of the components of the battery system of mobile device 300. As a result, the battery system of docking station 504 operates in substantially the same manner as mobile device 300 described above. While mobile device 300 and docking station 504 are similar, some differences exist. Docking station 504 does not include the one or more system components 309. Further, connector 323 of docking station 504 can be selectively coupled to node 322 or node 320, in order to provide tablet 502 with the voltage from battery 306 or the higher voltage provided by the battery system when it operates in the reverse mode.

Tablet 502 also contains a battery system, which is similar to the battery system in docking station 504. The battery system of tablet 502 includes a converter 506 and battery pack 508, each of which can provide low voltage (e.g., 2.0V-4.2V DC) power to one or more system components 510. Battery pack 508 includes a one cell battery 512 coupled to a field gauge integrated circuit (FGIC) 514.

The battery system of tablet 502 can operate in a charging or forward mode. In the charging mode, converter 506 converts high voltage power provided by an AC adapter (not shown) coupled to first supply node 516 or high voltage power provided by docking station 504. The voltage provided by docking station 504 can be either the voltage (i.e., 4V-8.4V DC) provided by battery 306 or the stepped up voltage provided by converter 302 at node 322. The converted power at node 524 can be used to recharge battery 512 or to operate the one or more system components 510. When the converter is not operating in the charging mode, converter 506 is disabled, but battery pack 508 continues to provide low voltage power to the one more system components 510.

Converter 506 includes a DC-DC converter 518, which is identical to the DC-DC converter 100 of docking station 504. DC-DC converter 518 operates as a step-down converter during the charging mode of operation, and converts high voltage provided at node 516 or node 522 into low voltage power at node 524. In the embodiment shown in FIG. 5, DC-DC converter 518 is not operated as a step-up converter.

Converter 506 includes a converter controller integrated circuit (CCIC) 526, which includes a microcontroller 530 and other components (not shown), e.g., analog-to-digital converters that can generate digital representations of T/Vout, T/Vin, T/Iin, etc. Microcontroller 530 can perform various functions in response to processing these digital representations and/or other information in accordance with executable instructions stored in memory. For example, microcontroller 530 can use the digital representations and/or other information to determine whether voltage is present at first supply node 516 and/or second supply node 522. If microcontroller 530 determines that a voltage is present at first supply node 516, microcontroller 530 can open switch 520 thereby isolating DC-DC converter 518 from second supply node 522. If microcontroller 530 determines that first supply node 516 is open and high voltage is present at second supply node 522, microcontroller 530 can close switch 520.

Microcontroller 530 can calculate a duty cycle for T/Vsw that is needed to convert the high voltage T/Vin at node 536 into low voltage at node 524. It is noted the duty cycle needed to maintain T/Vout at a particular voltage (e.g., 2.4 volts) depends on the magnitude of T/Vin, which may differ depending on whether switch 520 is opened or closed. Thus, microcontroller calculates the duty cycle of T/Vsw as a function of the magnitude of T/Vin that is measured at node 536. It is also noted that battery 512 can be more rapidly recharged by converter 506 using the higher voltage power provided reverse mode operated DC-DC converter 100 as opposed to the voltage provided by battery 306. Lastly, microcontroller 530 can determine if supply nodes 516 and 522 are both open (no voltage is detected at supply nodes 516 and 522). If no voltage is detected at these nodes, microcontroller 530 may disable DC-DC converter 518.

Battery pack 504 includes fuel gauge integrated circuit (FGIC) 514 that includes a microcontroller 532 and other components (not shown) such as analog to digital converters that generate digital representations of, for example, the voltage across battery 512 and the current flow into or out of battery 512. FGIC 514 is substantially similar to FGIC 308 of docking station 504. As such, microcontroller 532 performs essentially the same functions that are performed by microcontroller 316 described above. For example, microcontroller 532 can use the digital representations and/or other information to monitor operational parameters of battery 512. Microcontroller 532 can disconnect battery 512 if the voltage across battery 512 falls outside a predetermined range. Microcontroller 532 can also calculate the remaining time tablet 502 can operate before battery 512 needs to be recharged.

Figure 6:
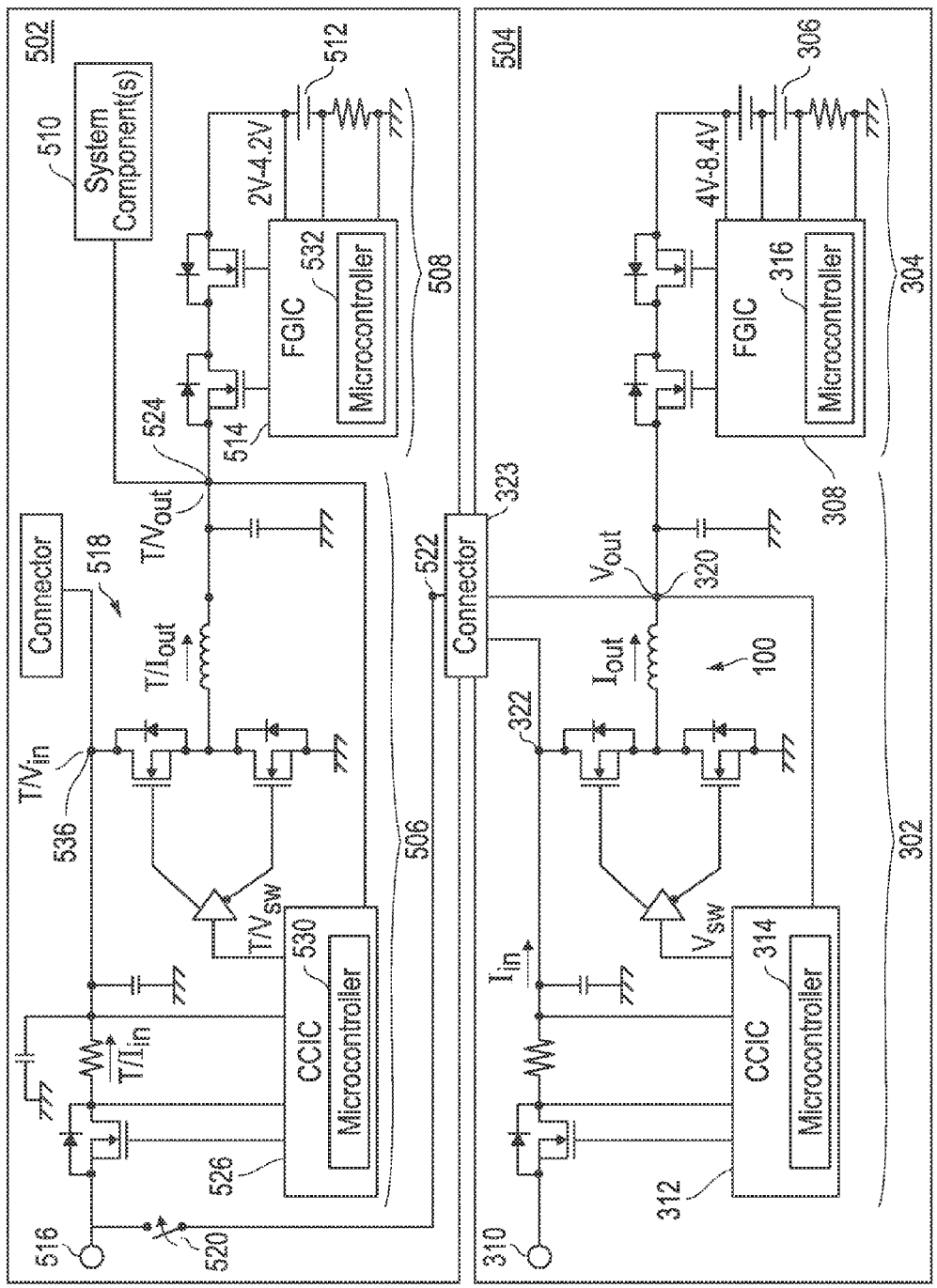
FIG. 6 is a block diagram illustrating example mobile devices, each employing a respective embodiment of the present invention.

In an alternative embodiment, tablet 502 may provide high voltage power to an external device. FIG. 6 illustrates tablet 502 shown in FIG. 5 with an external connector coupled to node 536. In this alternative embodiment, the functional aspects of microcontroller 530 are extended so that converter 506 can operate in the forward or reverse mode. Microcontroller 530 can detect the presence of an external device at connector 534. When the external device is detected, converter 506 operates DC-DC converter 518 in the reverse mode as a step-up converter to convert the low voltage of battery 512 into high voltage at node 536. This high voltage power is provided to the external device via connector 534. As the charge on battery 512 depletes, microcontroller 530 can dynamically adjust the duty cycle of T/Vsw in order to maintain the magnitude of voltage at node 536.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
   a supply node configured for direct or indirect coupling to a supply voltage;
   a converter coupled between an input node and an output node, wherein the converter is configured to operate in a forward mode or a reverse mode;
   wherein the converter generates a voltage at the converter output node for charging a battery when operating in the forward mode, wherein a magnitude of the voltage generated at the converter output node is less than a magnitude of the supply voltage;
   wherein the converter generates a voltage at the converter input node when operating in the reverse mode, wherein a magnitude of the voltage generated at the converter input node is different than a magnitude of a voltage provided by the battery;
   a control circuit coupled to and configured to control operation of the converter in the forward mode or the reverse mode;
   wherein the converter comprises a high side transistor, a low side transistor, and an inductor, wherein the high side transistor is coupled between the converter input node and a common node, wherein the converter input node is directly or indirectly coupled to the supply node wherein the low side transistor is coupled between the common node and a ground node, wherein the inductor is coupled between the common node and the converter output node, wherein the converter output node is configured for direct or indirect coupling to the battery;
   wherein the control circuit is configured to drive gates of the high side and low side transistors with complementary high side and low side square wave signals, respectively;
   wherein the magnitude of the voltage generated at the converter output node depends on a duty cycle of the high side square wave signal and the magnitude of the supply voltage, while the converter operates in the forward mode;
   wherein the magnitude of the voltage generated at the converter input node depends on the duty cycle of the high side square wave signal and the magnitude of the voltage provided by the battery, while the converter operates in the reverse mode;
   a voltage monitor circuit coupled to the control circuit and configured to monitor the voltage at the converter input node and the voltage at the converter output node;
   wherein the voltage monitor circuit generates a signal to decrease the duty cycle of the high side square wave signal if the magnitude of the voltage generated at the converter input node falls below a first predetermined value while the converter operates in the reverse mode;
   wherein the voltage monitor circuit generates a signal to increase the duty cycle of the high side square wave signal if the magnitude of the voltage generated at the converter output node falls below a second predetermined value while the converter operates in the forward mode.

2. The apparatus of claim 1:
   wherein current flows through the inductor from the common node to the converter output node when the supply node is coupled to the supply voltage and the converter output node is coupled to the battery, and;
   wherein current flows through the inductor from the converter output node to the common node when the supply node is not coupled to the supply voltage and the converter output node is coupled to the battery.

3. A system comprising:
   a first mobile device comprising:
   a first battery;
   a first supply node configured for direct or indirect coupling to a first supply voltage;
   a first converter coupled between a first input node and a first output node, wherein the first converter is configured to operate in a forward mode or a reverse mode;
   wherein the first converter generates a voltage at the first converter output node for charging the first battery when operating in the forward mode, wherein a magnitude of the voltage generated at the first converter output node is less than a magnitude of the first supply voltage;

wherein the first converter generates a voltage at the first converter input node when operating in the reverse mode, wherein a magnitude of the voltage generated at the first converter input node is different than a magnitude of a voltage provided by the first battery;

a first control circuit coupled to and configured to control operation of the first converter in the forward mode or the reverse mode;

wherein the first converter comprises a high side transistor, a low side transistor, and an inductor, wherein the high side transistor is coupled between the first converter input node and a first common node, wherein the first converter input node is directly or indirectly coupled to the first supply node, wherein the low side transistor is coupled between the first common node and a first ground node, wherein the a first inductor is coupled between the first common node and the first converter output node, wherein the first converter output node is configured for direct or indirect coupling to the first battery;

wherein the control circuit is configured to drive gates of the high side and low side transistors with complementary high side and low side square wave signals, respectively;

wherein the magnitude of the voltage generated at the converter output node depends on a duty cycle of the high side square wave signal and the magnitude of the supply voltage, while the converter operates in the forward mode;

wherein the magnitude of the voltage generated at the converter input node depends on the duty cycle of the high side square wave signal and the magnitude of the voltage provided by the battery, while the converter operates in the reverse mode;

a voltage monitor circuit coupled to the control circuit and configured to monitor the voltage at the converter input node and the voltage at the converter output node;

wherein the voltage monitor circuit generates a signal to decrease the duty cycle of the high side square wave signal if the magnitude of the voltage generated at the converter input node falls below a first predetermined value while the converter operates in the reverse mode;

wherein the voltage monitor circuit generates a signal to increase the duty cycle of the high side square wave signal if the magnitude of the voltage generated at the converter output node falls below a second predetermined value while the converter operates in the forward mode.

4. The system of claim 3
wherein current flows through the first inductor from the first common node to the first converter output node when the first supply node is coupled to the first supply voltage, and;
wherein current flows through the first inductor from the first converter output node to the first common node when the supply node is not coupled to the first supply voltage.

5. A system comprising:
a first mobile device comprising:
a first battery;
a first supply node configured for direct or indirect coupling to a first supply voltage;
a first converter coupled between a first input node and a first output node, wherein the first converter is configured to operate in a forward mode or a reverse mode;
wherein the first converter generates a voltage at the first converter output node for charging the first battery when operating in the forward mode, wherein a magnitude of the voltage generated at the first converter output node is less than a magnitude of the first supply voltage;
wherein the first converter generates a voltage at the first converter input node when operating in the reverse mode, wherein a magnitude of the voltage generated at the first converter input node is different than a magnitude of a voltage provided by the first battery;
a first control circuit coupled to and configured to control operation of the first converter in the forward mode or the reverse mode;
wherein the first converter comprises: a first component coupled between the first converter input node and a first common node, wherein the first converter input node is directly or indirectly coupled to the first supply node; a second component coupled between the first common node and a first ground node, and a first inductor coupled between the first common node and the first converter output node, wherein the first converter output node is configured for direct or indirect coupling to the first battery;
a second mobile device comprising:
a second battery;
a second supply node configured for direct or indirect coupling to a second supply voltage;
a second converter coupled between a second input node and a second output node, wherein the second converter is configured to operate in the forward mode or the reverse mode;
wherein the second converter generates a voltage at the second converter output node for charging the second battery when operating in the forward mode, wherein a magnitude of the voltage generated at the second converter output node is less than a magnitude of the second supply voltage;
wherein the second converter generates a voltage at the second converter input node when operating in the reverse mode, wherein a magnitude of the voltage generated at the second converter input node is different than a magnitude of a voltage provided by the second battery;
a second control circuit coupled to and configured to control operation of the second converter in the forward mode or the reverse mode.

6. The system of claim 5 wherein the second converter comprises:
a third component coupled between the second converter input node and a second common node, wherein the second converter input node is directly or indirectly coupled to the second supply node;
a fourth component coupled between the second common node and the second ground node, and;
a second inductor coupled between the second common node and the second converter output node, wherein the second converter output node is configured for direct or indirect coupling to the second battery.

7. The system of claim 6:
wherein the third component comprises a second high side transistor;
wherein the fourth component comprise a second low side transistor;
wherein the second control circuit is configured to drive gates of the second high side and low side transistors with complementary second high side and low side square wave signals, respectively;

wherein the magnitude of the voltage generated at the second converter output node during the forward mode of operation depends on a duty cycle of the second high side square wave signal and the magnitude of the second supply voltage;

wherein the magnitude of the voltage generated at the second converter input node depends on the duty cycle of the second high side square wave signal and the magnitude of the voltage provided by the second battery.

8. The system of claim 6 wherein current flows from the first battery through the first and second inductors, to recharge the second battery when the first supply node is not coupled to the supply voltage.

9. An apparatus comprising:

a converter coupled between an input node and an output node, wherein the converter is configured to operate in a forward mode or a reverse mode;

wherein the converter generates a voltage at the converter output node when operating in the forward mode;

wherein the converter generates a voltage at the converter input node when operating in the reverse mode;

a control circuit coupled to and configured to control operation of the converter in the forward mode or the reverse mode;

wherein the converter comprises a high side transistor, a low side transistor, and an inductor, wherein the high side transistor is coupled between the converter input node and a common node, wherein the low side transistor is coupled between the common node and a ground node, wherein the inductor is coupled between the common node and the converter output node;

wherein the control circuit is configured to drive gates of the high side and low side transistors with complementary high side and low side square wave signals, respectively;

wherein the magnitude of the voltage generated at the converter output node, while the converter operates in the forward mode, depends on a duty cycle of the high side square wave signal and the magnitude of the voltage at the input node;

wherein the magnitude of the voltage generated at the converter input node, while the converter operates in the reverse mode, depends on the duty cycle of the high side square wave signal and the magnitude of the voltage at the output node;

a voltage monitor circuit coupled to the control circuit and configured to monitor the voltage at the converter input node;

wherein the voltage monitor circuit generates a signal to decrease the duty cycle of the high side square wave signal if the magnitude of the voltage generated at the converter input node falls below a first predetermined value, while the converter operates in the reverse mode.

* * * * *